Gerard P. Canevari
John F. Delahunt    Inventors

United States Patent Office 2,963,045
Patented Dec. 6, 1960

2,963,045

COATED PIPELINE AND METHOD OF COATING METAL ARTICLE TO PROTECT IT AGAINST CORROSION

Gerard P. Canevari, Metuchen, and John F. Delahunt, Nutley, N.J., assignors to Esso Research and Engineering Company, a corporation of Delaware Filed Mar. 25, 1958, Ser. No. 723,810

17 Claims. (Cl. 138—68)

This invention relates to protective coatings for metal articles. It relates particularly to such coatings applied in laminated form. It relates more particularly to such coatings in which the several laminae are of different materials, and it relates still more particularly to laminated coatings of different materials for underground pipelines intended to carry hydrocarbon liquids such as petroleum products.

External coatings are applied frequently to pipelines intended to carry hydrocarbon liquids and be buried in the soil. These coatings have a primary purpose of protecting such pipelines against external corrosion. They have a secondary purpose of protecting such pipelines against mechanical abrasion from external means such as rocks which may fall on or be driven against or along pipelines during burying operations. Commonly used coating materials are those having a petroleum asphalt or coal tar base. These are applied directly adjacent the pipe surface in thicknesses in the range of 60 to 100 mils, for example, 90 mils. The coating of asphalt or coal tar which constitutes the primary means of protection of the pipeline is ordinarily provided with a wrapping of such materials as kraft paper, asbestos felt, or glass cloth.

Asphalt and coal tar base coatings have a significant deficiency for service on underground pipelines carrying hydrocarbon liquids, namely, their susceptibility to dissolution by such liquids. These liquids will be present to attack a pipeline coating externally if they have saturated the surrounding soil due to a leak or break in the pipeline and its coating in question or some other pipeline nearby. Wrapping materials such as those cited will not protect the principal asphalt or coal tar coating from external hydrocarbon attack because these materials are themselves soluble in or permeable by hydrocarbon liquids.

It is possible also for asphalt or coal tar applied on a pipeline in the conventional method to be attacked from the inside out. Such attack will occur if a pipeline carrying hydrocarbon liquid at quite low pressure develops a very slow leak. The leaking liquid, not emerging with force sufficient to rupture the pipeline coating, will dissolve the coating locally immediately adjacent the pipe, and continue this action outwardly and along the pipe so long as leakage persists. Hydrocarbon dissolution of a pipeline coating from the inside out is, however, a problem of less importance than that of external dissolution due to hydrocarbon impregnated soil.

Coal tar base coatings are less susceptible to hydrocarbon attack than are those having an asphalt base, but their susceptibility is still sufficiently great to constitute a noticeable disadvantage for underground petroleum pipeline service. The ultimate potentially deleterious possibility with either asphalt or coal tar coatings is, of course, that a pipeline will become exposed for local corrosion by chemicals or electrolytic circuits in the soil if a patch of coating be dissolved entirely.

The object of the present invention is to provide a method of protecting metal articles, particularly petroleum carrying pipelines, against corrosion by which method a coating is formed on the article which will be resistant to mechanical damage from external means, and will present both a final indissoluble barrier to hydrocarbon attack from without and an initial barrier to such attack from within.

In accordance with this invention a multi-layer protective coating is applied to pipelines carrying hydrocarbon liquids. The innermost or first layer from 2 to 5 mils thick comprises an oxidized oily polymer resin which is both resistant to hydrocarbon attack and strongly inhibitive of corrosion, and the next succeeding or second layer from 60 to 100 mils thick comprises petroleum asphalt or coal tar which performs the customary mechanical shielding function.

The resin of which the innermost layer of the protective coating of this invention is comprised should be made by oxidation of a polymer oil having 70 to 100 parts by weight of a conjugated diolefin of 4 to 6 carbon atoms such as butadiene-1,3 and 30 to 0 parts by weight of a vinyl aromatic hydrocarbon such as styrene. A preferred range of polymer composition for development of best drying rate, chemical resistance and aging characteristics is 75 to 85 parts of butadiene-1,3 and 25 to 15 parts of styrene. Such polymers may be prepared as liquids by solution polymerization in the presence of a finely divided alkali metal catalyst and a hydrocarbon solvent as described in U.S. Patent No. 2,762,851, issued September 11, 1956, to A. H. Gleason, the subject matter of which is incorporated herein by reference.

Polymers obtained by the above method may be used as synthesized or may be modified with maleic anhydride in accordance with the teachings of U.S. Patent No. 2,652,342, issued September 15, 1953, to Gleason. In either case, however, they are dissolved in any aliphatic or aromatic hydrocarbon solvent or mixture thereof boiling at temperatures up to 400° F. with which they are compatible, and blown with air or oxygen at temperatures between room temperature and about 280° F., preferably 200° to 260° F., until 5 to 20% oxygen, for example, 15% oxygen, has been incorporated in the polymer oil. The resulting solution of oxidized polymer, with or without the addition of pigments for thickening, hardening, etc., may be applied on a pipeline or other metal article to give a varnish type coating and then cured in accordance with the techniques of this invention. Application of the solution may be effected with a brush, a felt or rubber roller, a spray gun, or other convenient means.

The nature of this invention will be more readily understood from the ensuing description when read in conjunction with the following drawings in which.

Figure 1:
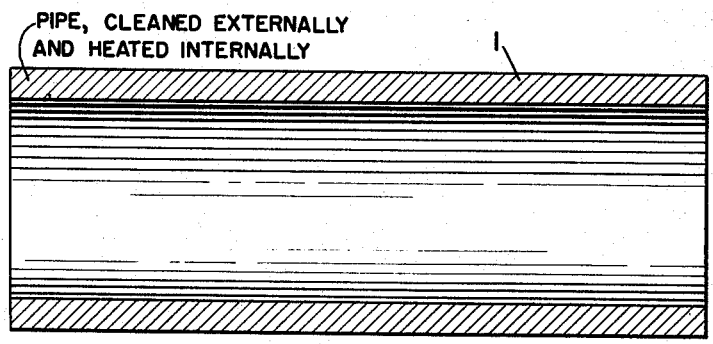
Fig. 1 represents a sectional view of a length of pipe cleaned and preheated to receive the first protective layer or prime coat of oxidized oily polymer resin.
Figure 2:
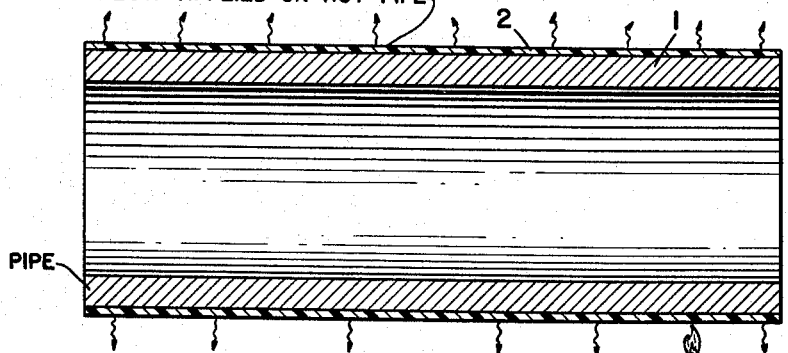
Fig. 2 represents a sectional view of a length of heated pipe with the first protective layer or prime coat of oxidized oily polymer resin in place and undergoing initial curing.

Referring now to Fig. 1, the length of pipe 1 which is to be given a protective coating is cleaned externally as for a normal asphalt or coal tar base coating application, and is heated, preferably internally, to a temperature of 250° to 325° F. The first protective layer or prime coat of oxidized oily polymer resin is then applied to the exterior pipe surface to a thickness of 2 to 5 mils. In Fig. 2 this first layer is designated 2. The heat of the pipe metal is sufficient to drive off the major quantity of the solvent vehicle of the polymer resin coating 2, and in Fig. 2 the departure of this solvent is indicated by arrows.

The heat of the pipe, while available in a quantity and at a temperature sufficient to drive off solvent, will not be adequate to cure the initial coating 2. A second, more intense heat source is needed for this. Considerable heat will be available from asphalt in the temperature range of 350° to 500° F. applied as the second protective layer, but this too, although of considerable curative effect, will not be sufficient to effect complete curing. Accordingly, after the bulk of the solvent has been driven from the polymer resin coating 2 by pipe heat as indicated in Fig. 2, curing of coating 2 is initiated by flame or sulfur dioxide. A burner head 3 is indicated in Fig. 2.

A ribbon burner flame of a non-luminous or oxidizing nature and 1000°–1100° F. temperature is desirable. Rapid relative movement between the pipe and the burner is effected with the pipe axis being perpendicular to the longer flame dimension. The temperature at the interface of pipe 1 and coating 2 reaches 400°–800° F. or higher as an instantaneous peak temperature, preferably 550°–600° F. as the flame impinges on any particular area, and then immediately drops as the flame passes it. While the upper temperature limit may reach even higher than 800° F., it should always be below the ignition temperature of the coating.

An alternate method of effecting an initial cure is to expose the pipe bearing a first protective layer of oxidized oily polymer resin to an atmosphere of sulfur dioxide. This procedure is apt, however, to be more cumbersome and less easily controlled than initial curing by flame.

Figure 3:
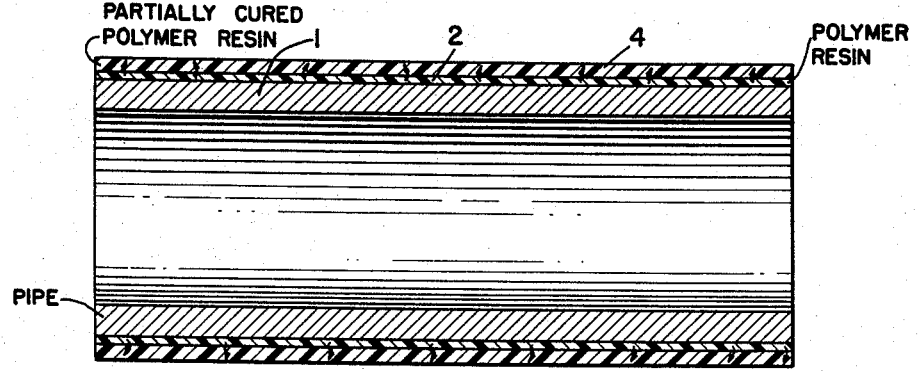
Fig. 3 represents a sectional view of a length of pipe with both the first protective layer of oxidized oily polymer resin and the second protective layer of hot asphalt in place and the first layer undergoing completion curing from the heat in the second layer.

Only a partial curing of the first protective layer of polymer resin by flame is needed or should be attempted. Completion of curing will be effected by heat from the second protective layer of asphalt to be applied. This is advantageous in that no close control of the application of burner 3 to heat coating 1 long enough to fully cure it but not long enough to blister it is required. As shown by Fig. 3 the second protective layer 4 consisting of asphalt at a temperature in the range of 350° to 500° F. is applied directly on the polymer resin layer 2 to a thickness of 60 to 100 mils. This application is effected by means well known in the pipeline art. Such a mass of asphalt at such temperatures will supply heat enough to the polymer resin layer 2 to complete its normal thermal curing. Likewise the asphalt will effect a residual amount of sponge curing as it absorbs final vestiges of hydrocarbon solvent from the first protective layer. Migration of solvent traces into the asphalt is indicated by arrows.

Following application of the asphalt layer 4, other processes to complete the external protection of the pipe such as wrapping may be carried out. These, however, do not constitute a part of the present invention.

In the procedure so far disclosed curing of the first protective layer of oxidized oily polymer resin is effected in two steps, first by an external flame or atmosphere of sulfur dioxide, and second by the heat of a second protective layer of asphalt applied at a temperature of 350° to 500° F. in a thickness many times greater than that of the polymer resin layer. This procedure can be reduced to a single step if an asphalt application temperature of 500° to 600° F. be used. Asphalt applied in this temperature range, if applied in the ratio of thicknesses to the polymer resin layer already disclosed, will be able to supply sufficient heat at sufficient temperature to cure the polymer resin layer completely without the need of any primary curing by flame or sulfur dioxide.

To this point disclosure of the present invention has related only to coating combinations of oxidized oily polymer resin and petroleum asphalt. The invention may be extended, however, to combinations of a first protective layer of oxidized oily polymer resin and a second layer of coal tar base material. In such extension, however, full curing of the innermost protective layer of oxidized oily polymer resin must be effected by flame or sulfur dioxide before application of the second protective layer of coal tar base material. This is because coal tar base coating materials are applied at temperatures in the range of 300 to 350° F., and would therefore not be hot enough to do any curing of the resin layer.

The advantages of this invention are several, and while they will accrue to metal articles generally which require protection against corrosion they have particular significance in the case of petroleum carrying pipelines intended for underground installation. The initially thick outer coating layer of asphaltic or bituminous material on such a pipeline will be highly resistant to mechanical abrasion during pipeline burying operations to prevent exposure of metal surfaces at that time. After the pipeline has been buried this outer coating may be attacked by hydrocarbons in the soil, but even if it be dissolved completely there will still remain the inner coating layer of oxidized oily polymer resin to protect the pipeline against corrosion by chemicals or electrolytic circuits in the soil. Since the pipeline and the surrounding soil will have long since assumed attitudes of rest, there will be no working of rocks or sand adjacent the resin layer which, although thin, will resist corrosive materials from without and hydrocarbons from either within or without indefinitely.

What is claimed is:

1. A method of protecting a metal article against corrosion comprising heating said article to achieve a temperature of 280° to 325° F. on the surfaces thereof selected to be protected; applying a first protective layer thereon, said layer comprising a solid resin formed by oxidation of a polymer oil comprising 70 to 100 parts by weight of butadiene-1,3 and up to 30 parts by weight of styrene; effecting partial curing of said first protective layer by subjecting said layer to direct action of an open flame in the presence of oxygen, and applying a second protective layer directly on said first layer, said second layer comprising a petroleum asphalt and being applied at 350° to 500° F. whereby said first layer is finally cured.

2. A method of protecting a metal article against corrosion according to claim 1 in which said partial curing of said first protective layer is effected by exposing said first layer to an atmosphere of sulfur dioxide.

3. A method of protecting a metal article against corrosion comprising heating said article to achieve a temperature of 280° to 325° F. on the surfaces thereof selected to be protected; applying a first protective layer thereon, said layer comprising a solid resin formed by oxidation of a polymer oil comprising 70 to 100 parts by weight of butadiene-1,3 and up to 30 parts by weight of styrene, and applying a second protective layer directly on said first layer, said second layer comprising a petroleum asphalt and being applied at 500° to 600° F. whereby said first layer is fully cured.

4. A method of protecting a metal article against corrosion comprising heating said article to achieve a temperature of 280° to 325° F. on the surfaces thereof selected to be protected; applying a first protective layer thereon, said layer comprising a solid resin formed by oxidation of a polymer oil to contain 5 to 20% oxygen and said polymer oil comprising 70 to 100 parts by weight of butadiene-1,3 and up to 30 parts by weight of styrene; effecting full curing of said first protective layer by subjecting said layer to direct action of an open flame in the presence of oxygen, and applying a second protective layer directly on said first layer, said second layer comprising a coal tar base material.

5. A method of protecting a metal article against corrosion according to claim 4 in which said full curing of said first protective layer is effected by exposing said first layer to an atmosphere of sulfur dioxide.

6. A protected metal article comprising a metal article having a laminated, corrosion resistant coating, said coating including a first layer affixed to said article which first layer comprises a solid resin which comprises an oxidized polymer oil containing 70 to 100 parts by weight of a $C_4$ to $C_6$ conjugated diolefin and up to 30 parts by weight of a vinyl aromatic hydrocarbon, and a second layer affixed to said first layer which second layer comprises a petroleum asphalt.

7. A protected metal article according to claim 6 in which said metal article comprises a pipeline.

8. A protected metal article according to claim 6 in which said first layer of said coating is 2 to 5 mils thick and said second layer of said coating is 60 to 100 mils thick.

9. A protected metal article according to claim 6 in which said first layer of said coating comprises a resin formed by oxidation of a polymer oil to contain 5 to 20% of oxygen.

10. A protected metal article according to claim 6 in which said first layer of said coating comprises a resin formed by oxidation of a polymer oil including 70 to 100 parts by weight of butadiene-1,3 and up to 30 parts by weight of styrene.

11. A protected metal article according to claim 6 in which said first layer of said coating comprises a resin formed by oxidation of a polymer oil including 75 to 85 parts by weight of butadiene-1,3 and 25 to 15 parts by weight of styrene.

12. A protected metal article comprising a metal article having a laminated, corrosion resistant coating, said coating including a first layer affixed to said article which first layer comprises a solid resin which comprises an oxidized polymer oil containing 70 to 100 parts by weight of a $C_4$ to $C_6$ conjugated diolefin and up to 30 parts by weight of a vinyl aromatic hydrocarbon, and a second layer affixed to said first layer which second layer comprises a coal tar base material.

13. A protected metal article according to claim 12 in which said metal article comprises a pipeline.

14. A protected metal article according to claim 12 in which said first layer of said coating is 2 to 5 mils thick and said second layer of said coating is 60 to 100 mils thick.

15. A protected metal article according to claim 12 in which said first layer of said coating comprises a resin formed by oxidation of a polymer oil to contain 5 to 20% of oxygen.

16. A protected metal article according to claim 12 in which said first layer of said coating comprises a resin formed by oxidation of a polymer oil including 70 to 100 parts by weight of butadiene-1,3 and up to 30 parts by weight of styrene.

17. A protected metal article according to claim 12 in which said first layer of said coating comprises a resin formed by oxidation of a polymer oil including 75 to 85 parts by weight of butadiene-1,3 and 25 to 15 parts by weight of styrene.

References Cited in the file of this patent

UNITED STATES PATENTS

| | | |
|---|---|---|
| 2,196,172 | Billings | Apr. 9, 1940 |
| 2,536,107 | Sugarman | Jan. 2, 1951 |
| 2,701,780 | Nelson | Feb. 8, 1955 |
| 2,708,289 | Collings | May 17, 1955 |
| 2,752,267 | Shideler | June 26, 1956 |
| 2,787,557 | Christensen | Apr. 2, 1957 |
| 2,809,901 | Bach | Oct. 15, 1957 |